July 22, 1924.
M. VITEK
CLAMP
Filed Sept. 6, 1921
1,502,362
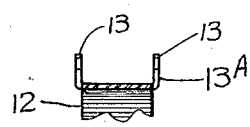
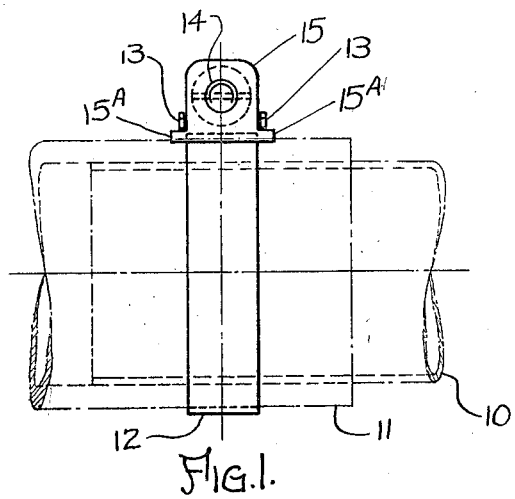
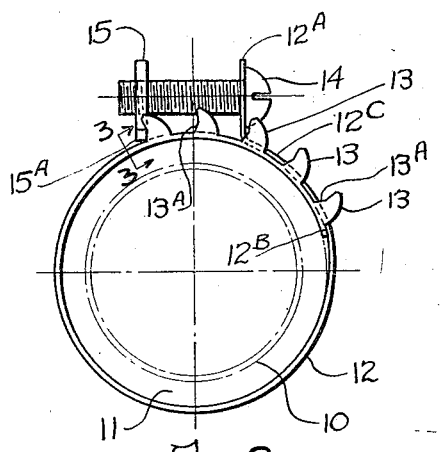
INVENTOR
Marie Vitek
BY
Frank J Schraeder Jr
Attorney.

Patented July 22, 1924.

1,502,362

UNITED STATES PATENT OFFICE.

MARIE VITEK, OF MAYWOOD, ILLINOIS.

CLAMP.

Application filed September 6, 1921. Serial No. 498,809.

*To all whom it may concern:*

Be it known that I, MARIE VITEK, a citizen of the Republic of Czechoslovakia, residing at Maywood, in the county of Cook and State of Illinois, have invented a new and useful Improvement in Clamps, of which the following is a specification.

This invention relates to improvements in hose clamps.

An object of the invention is to provide a hose or pipe clamp in which, through simple manipulation of an adjusting screw, the entire circumference of the outer hose or pipe, and particularly the side walls of the same, are firmly gripped and pressed against the inner one.

Another object of the invention is to provide means in this clamp for positively releasing the legs of the clamp from the side walls when it is desired to disconnect one of the tubular members from the other.

It is, furthermore, an object of the invention to provide a novel form of a hose clamp, which can be manufactured at very small expense, and which can be manipulated in a very simple way for fastening two tubular members at their telescoping ends to each other.

With these and other objects in view, an embodiment of the invention is illustrated in the accompanying drawings, and is described in the following specification, the novel features being pointed out in the appended claims.

In the drawings:

Figure 1 is a side elevation of a hose clamp embodying my invention and Figure 2, an end elevation thereof. Figure 3 is a cross section taken on line 3—3 of Figure 2.

Referring to the drawings which illustrate one form of my invention, the clamp is shown as connecting or clamping a pipe 10 telescoped within a hose 11, and the structure shown comprises a flexible steel band 12 formed substantially into a ring with overlapping ends 12$^A$ and 12$^B$. The portion of the clamp near the end 12$^B$ is formed with a plurality of pairs of retaining prongs 13 right-angularly disposed to the integral band portion. These prongs 13 are spaced longitudinally of the clamp a sufficient distance apart to permit a free passage of the other overlapping end portion therebetween.

The end 12$^A$ is bent angularly as shown and is provided with a loosely mounted screw 14 the end of which has operative connection with a lock nut 15.

The lock nut 15, here shown, is formed slightly shorter than the width of the band 12, and has a pair of oppositely disposed arms 15$^A$ formed integral with lower ends of the sides of the nut. These short integral arms 15$^A$ are adapted to engage the inner faces 13$^A$ of either set or pair of prongs 13 to lock the two ends of the clamping band together. It is thus obvious that when the clamp is placed about a pair of telescoping members, as for instance a pipe and hose connection shown in the drawings, with the lock nut 15 engaging or in hooked position with the prongs 13, the tightening of screw 14 will forcibly grip the clamp over the telescoping members, the end portion 12$^C$ of the clamp band sliding over the portion 12$^B$ between the prong 13 which also act as guides and thus prevent any twisting of the clamp ends during such tightening action.

I claim:

1. A clamp comprising a flexible band having a tightening member at one end thereof, a nut for said tightening member, a plurality of pairs of separated prongs on the other end of said band and so constructed and arranged to receive between them and guide the end carrying the tightening member, said nut adapted to engage said pairs of prongs for locking engagement therewith.

2. A clamp comprising a flexible band having a tightening member at one end thereof, a nut for said tightening member, a plurality of pairs of prongs on the outer edges of the other end, said nut adapted to engage either of said pairs of prongs for locking engagement therewith.

3. A clamp comprising a flexible band having a tightening member at one end thereof, a lock nut for said tightening member, a plurality of pairs of prongs on the other end of said band, said nut adapted to engage either one of said pairs of prongs for locking engagement therewith.

In witness whereof, I have hereunto subscribed my name this 1st day of September, 1921.

MARIE VITEK.